United States Patent
Fuhr et al.

[19]

[11] Patent Number: 6,129,832
[45] Date of Patent: Oct. 10, 2000

[54] DEVICE AND METHOD FOR ADJUSTING ION CONCENTRATIONS

[75] Inventors: Günter Fuhr; Rolf Hagedorn, both of Berlin, Germany

[73] Assignee: Gunter Fuhr, Berlin, Germany

[21] Appl. No.: 09/068,764

[22] PCT Filed: Nov. 4, 1996

[86] PCT No.: PCT/EP96/04794

§ 371 Date: Jul. 14, 1998

§ 102(e) Date: Jul. 14, 1998

[87] PCT Pub. No.: WO97/18503

PCT Pub. Date: May 22, 1997

[30] Foreign Application Priority Data

Nov. 14, 1995 [DE] Germany .............................. 195 42 375
May 3, 1996 [DE] Germany .............................. 196 17 828
Jun. 18, 1996 [DE] Germany .............................. 196 24 150
Aug. 28, 1996 [DE] Germany .............................. 196 34 829

[51] Int. Cl.[7] .................................................. G01N 27/26
[52] U.S. Cl. .......................................... 205/775; 204/400
[58] Field of Search ................................ 205/775, 787.5; 204/400, 610, 548, 459, 644, 600; 210/743; 436/163; 422/100, 75

[56] References Cited

U.S. PATENT DOCUMENTS

| | | |
|---|---|---|
| 4,152,215 | 5/1979 | Yoshino et al. . |
| 4,936,962 | 6/1990 | Hatzidimitriu . |
| 5,514,639 | 5/1996 | Fisher et al. .............................. 504/116 |

FOREIGN PATENT DOCUMENTS

| | | |
|---|---|---|
| 0026591A1 | 4/1981 | European Pat. Off. . |
| 55-131331 | 10/1980 | Japan . |
| 1177693 | 1/1970 | United Kingdom . |
| WO-9601422 | 1/1996 | WIPO . |

OTHER PUBLICATIONS

P. Bergveld, B.H. v.d. Schoot and J.H.L. Onokiewicz, "Analytica Chimica Acta" 151, Jan. 17, 1983, pp. 143–151 Development of a Microprocessor–Controlled Coulometric System for Stable ph Control.

Jan Pospichal, Josef Chmelik, and Mirko Deml, "J. Microcolumn Separations" 7(3) 213–219 (1995). Micropreparative Focusing of Proteins in Carrier–Ampholyte–Free Solution with Electrically Controlled Compositions of Electrolytes, pp. 213–219.

J. Posphical, M. Deml, and P, Bocek—Journal of Chromatography, 638 (1993) 179–186.

Institute of Analytical Chemistry, Czech Academy of Sciences, Veveri 97, 611 42 Brno (Czech Republic) Electrically Controlled Electrofocusing of Ampholytes Between Two Zones of Modified Electrolyte With Two Different Values of pH O. Shimomura, Faculty of Engineering, Yamanashi Univeristy, 3–11 Takeda–4, Kofu 400, Japan, Sep. 1, 1994.

Fast Growth and Evaluation of Potassium Dihydrogen Phosphate Single Crystals by Electrodialysis with PH Control 2300 Journal of Crystal Growth, 144(1994) Dec. 11, No. 3/4, Amsterdam, NL, pp. 253–257.

(List continued on next page.)

*Primary Examiner*—T. Tung
*Assistant Examiner*—Albi Noguerola

[57] ABSTRACT

A device for amperometric adjustment of an ion concentration in an adjustment solution comprises at least three chamber-shaped electrolyte regions, each with a control electrode and diffusion depressant means and which can be filled with electrolytes, whereby all electrolyte regions can be brought into contact with the adjustment solution in such a way that, when current flows through the control electrodes, ions can be transported from the electrolyte solutions through the diffusion depressant means into the adjustment solution or in the reverse direction, and means for supplying each electrolyte region with control currents. The device is designed for adjusting the pH value and/or an ion concentration of the adjustment solution different to the hydrogen ion concentration. At least two or all electrolyte regions are supported by a joint holding means.

26 Claims, 11 Drawing Sheets

OTHER PUBLICATIONS

B. Fuhrmann, U. Spohn and K.H. Mohr Martin–Luther–Universitat, Halle–Wittenberg, Institut fur Biotechnologic, Weinbergweg 16a D(O)–4050 Halle. Germany Enzymatic Assays Based on the Coulometric Microflow Titration of Ammonia and Cabon Dioxide, Biosensors & Bioelectronics 7 (1992) 653–660, Aug. 5, 1992, pp. 653–660.

Bart H. Van Der Schoot, Hans Voorthuyzen and Piet Bergveld Faculty of Electrical Engineering, Univeristy of Twente, P.O. Box 217, NL–7500 AE Enschede (The Netherlands) The Ph–Static Enzyme Sensor: Design of the Ph Control System Sensors and Actuators, B1 (1990) 546–549, pp. 546–549.

Jan Pospichal, Josef Chmelik, and Mirko Deml, "J. Microcolumn Separations" 7(3) 213–219 (1995).

J. Posphical, M. Deml, and P, Bocek—Journal of Chromatography, 638 (1993) 179–186.

Caplus abstract of Matsushita (JP 55131331 A2), Oct. 1980.

Nagy et al. "E. Anal. Chim. Acta" 91 (1977) 87. Month Unknown.

Shimomura et al. "Trans. IECE" Japan J 67 C 673 (1984). Month Unknown.

Yokotani et al. "J. Crystal Growth" 67 (1984) 627. Month Unknown.

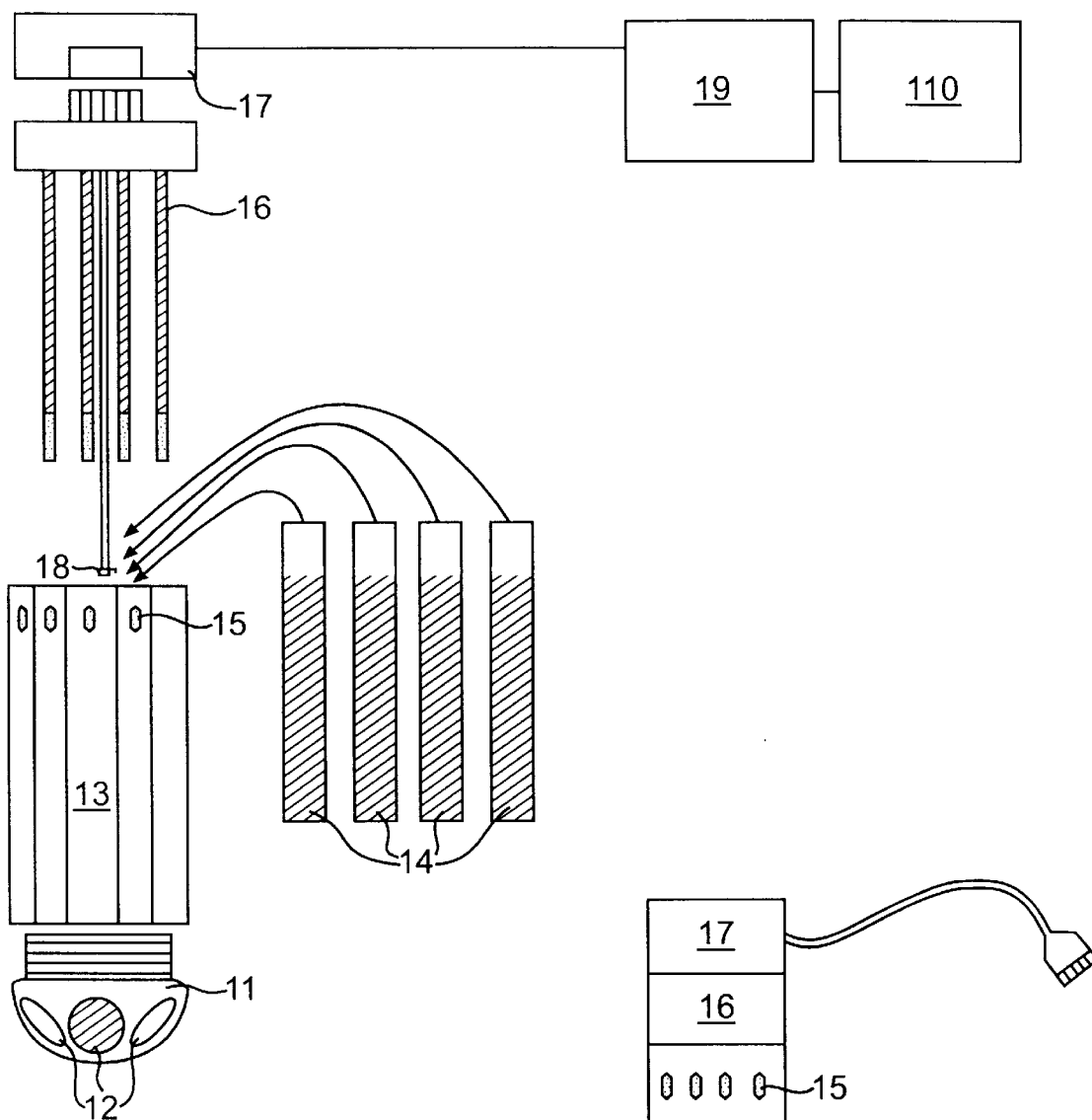
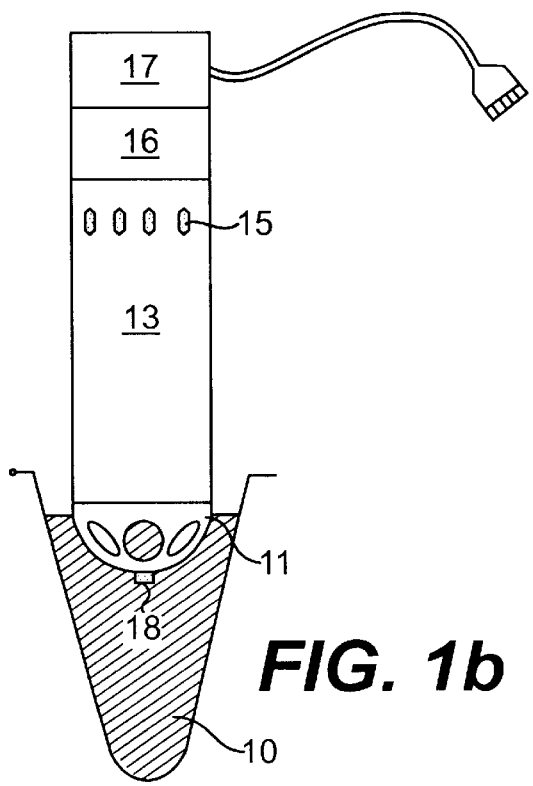
FIG. 1a
FIG. 1b

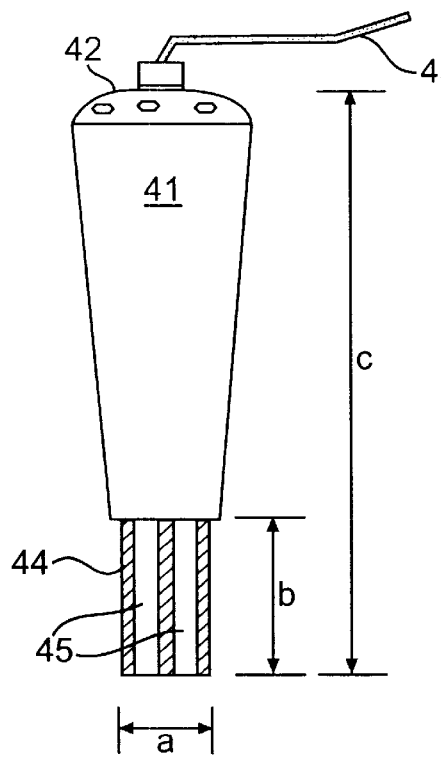
FIG. 4a
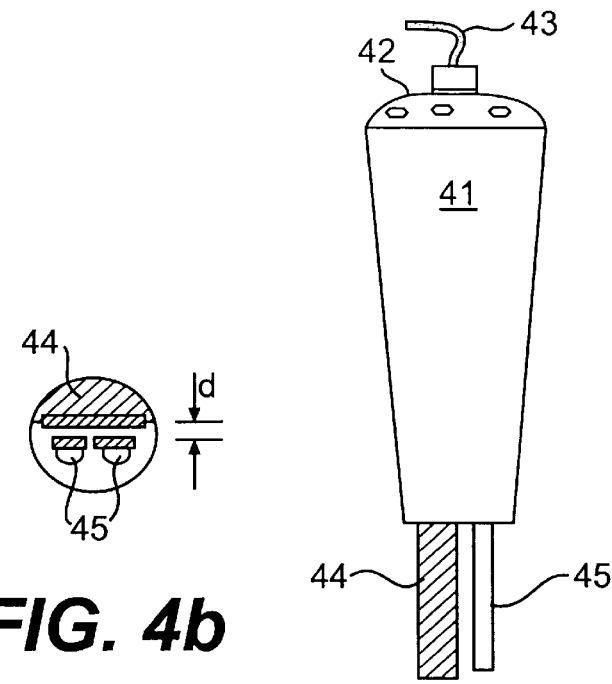
FIG. 4b
FIG. 4c
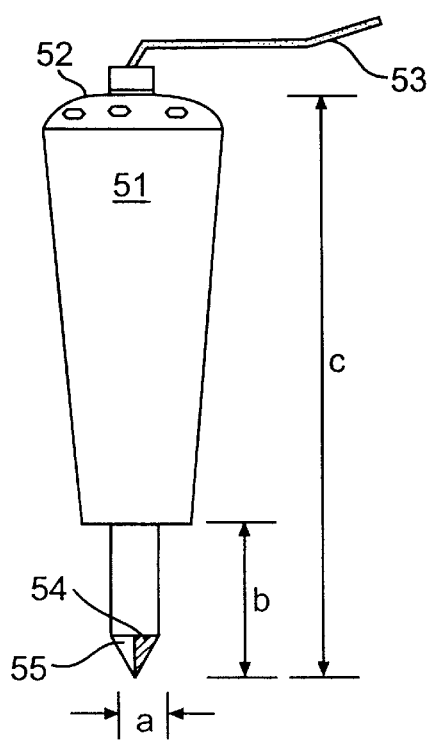
FIG. 5a
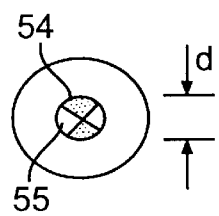
FIG. 5b
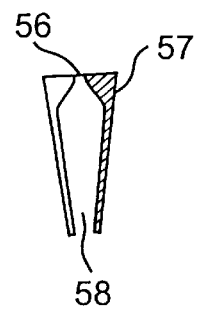
FIG. 5c

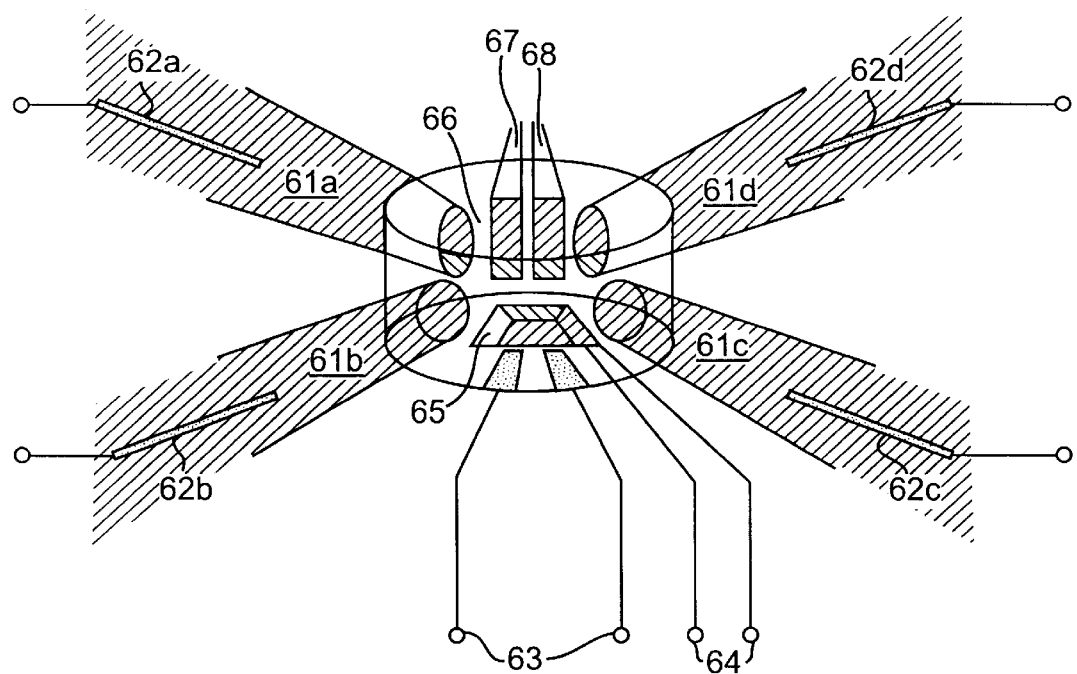
FIG. 6
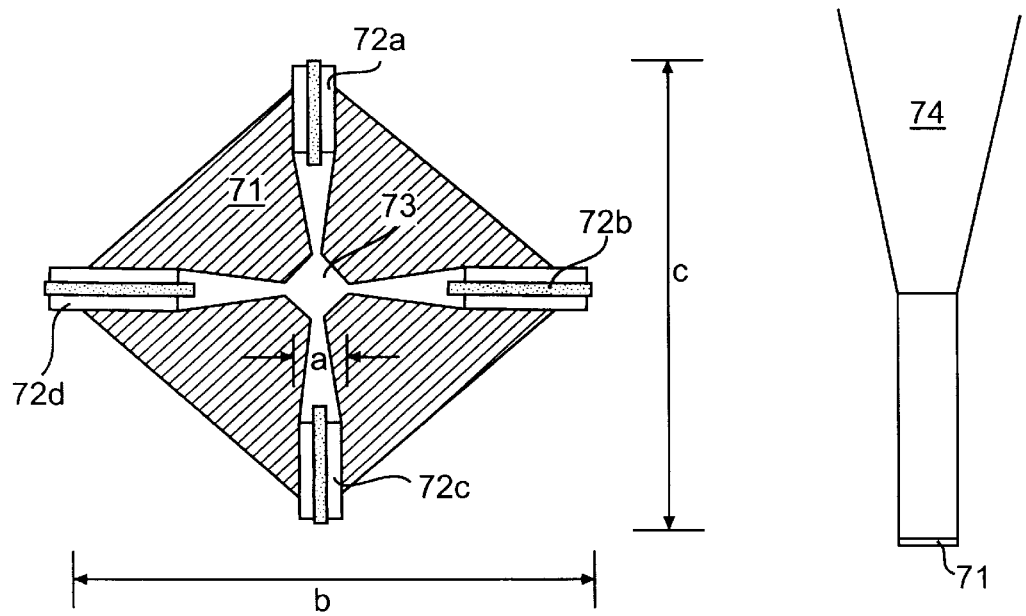
FIG. 7a  FIG. 7b

DEVICE AND METHOD FOR ADJUSTING ION CONCENTRATIONS

This application is the national phase under 35 U.S.C. §371 of prior PCT International Application No., PCT/EP96/04794, which has an International filing date of Nov. 4, 1996, which designated the United States of America, the entire contents of which are hereby incorporated by reference.

BACKGROUND OF THE INVENTION

The invention refers to a device and a method by which the ion concentration in a solution can be adjusted, regulated and measured amperometrically. The invention relates in particular to a device for adjusting and regulating pH values.

In the field of pH adjustment it is common, especially in laboratories, to adjust pH by titration with solutions (usually acids and bases). Adjustment of the pH value in this way is only possible by increasing volume, which, especially with small quantities of solution, is substantial or difficult to dose. What is more, considerable effort is involved in adjusting unbuffered solutions to an accuracy in the range 1/10 or 1/100 of pH. Diluted acids and bases are used to achieve this accuracy, which contributes further to the drawback of increased volume. Automation is elaborate and complicated because of the means of dosing that are needed. It is also common to titrate ions with the aid of current flow (e.g. Nagy, G. et al., E. Anal. Chim. Acta, 91 [1977] 87). But the device involved presents the disadvantage that electrodes are immersed direct in the solution to be titrated. This can lead to unacceptable electrode reactions with formation of radicals, especially on the anode.

The greatest problems result when adjusting pH values in volumes in the ml region and below, these being indispensable in particular for genetic, diagnostic medical and biochemical methods. Simply filling a solution from one plastic vessel into another produces uncontrolled pH alterations of up to half a unit and more, which can be explained by the surface properties of these vessels (clinging molecules, ion exchanger characteristics, etc). These changes are currently tolerated, or they are countered by elaborate rinsing with large consumption of solution. Added to this is the fact that the pH value often has to be controlled and possibly readjusted in small volumes (especially in diagnostic medical, biotechnical or pure technical routine chores), and here a change in volume and the associated alteration of the chemical solution is entirely unacceptable, or the disadvantages are recognized and tolerated. For this reason, in techniques that must make do with a very limited volume of solution, it is scarcely possible at present to correct pH, which can repeatedly cause inaccuracies in tests and reaction conditions.

Other principles are familiar where pH alterations are produced by electrolytically generated ion currents. Use is made here of the classic principle whereby, in electrolysis of a salt (e.g. $NaNO_3$), the anode region becomes more acidic because of the accumulation of anions (e.g. $NO_3^-$) and the cathode region more basic as a result of the accumulation of cations (e.g. $Na^+$). The cause of this is to be found in the redox reactions on the electrodes.

The transport processes involved in pH shifts are described in more detail in what follows.

In theory, every pH shift—whether intentional or unintentional, whether on electrodes or in a free solution—is based on the fact that, in the solution considered, there is a shift in the difference between the sum of all cations minus the sum of all anions (whereby the $H^+$ and $OH^-$ ions are to be left out of the calculation). A method that influences the pH value of a solution by electrical means must consequently be able to alter this difference. The necessary prerequisites for this are already to be found in the classic works of Kohlrausch (Ann. d. Phys., 62 [1897] 209), Logsworth (J. Am. Chem. Soc., 67 [1945] 1109) and MacInnes (The Principles of Electrochemistry, Reinhold Publ. Co., New York, 1939) and will be explained taking an $NaNO_3$ solution as an example:

The $Na^+$ concentration must be increased and/or the $NO_3^-$ concentration reduced to make the solution more basic. If Regulation is to be by electrical means, this means that the number of Na ions introduced to the solution electrically must be greater than the number of Na ions simultaneously escaping.

In a current-carrying electrolyte there is an inflow of cations (anions) on one side and an outflow of cations (anions) on the opposite side, so the pH value of the solution does not alter. But if an electrolyte phase contains an electrode, there is no longer any ion current flow on the electrode, ie an ion type is only able to either reach or leave the particular region.

The general prerequisite for a change of concentration of a particular ion type in a certain volume is that this ion type exhibit a divergent current flow. According to Kohlrausch, this is the same as saying that the transport number of the particular ion type in the volume considered must not be constant. This is always the case with the electrodes in aqueous systems. The current flow in the electrodes is through electrons, while the current in adjacent electrolytes is produced by migrating ions. For this reason the H current flow exhibits a divergence for example, so there must always be pH shifts in the region of the electrode for current flow in aqueous systems. This mechanism includes the course of redox reactions, and consequently it is ruled out as the basis for a generally applicable ion adjustment system.

If the pH value of a solution containing NaCl is to be adjusted for example (solutions of this kind are widely used in biomedicine), there may easily be formation of hypochlorite or even chlorate ions on the anodes. These ions would have an adverse effect on the solution to be adjusted because they disinfect and bleach (contamination).

Despite this drawback, the redox reactions on electrodes are of considerable interest, so reactions that change the pH value in the region of the electrode through redox processes are also used and investigated (cf Van der Schoot, B., Voorthuyzen, H. and Bergveld, P.: Sensors & Actuators, B1 [1990] 546; Fuhrmann, B., Spohn, U. and Mohr, K. -H.: Biosensors & Bioelectronics 7 [1992] 653, Electrolytic titrating device, DE-PS 15 98 597 [Method and device for determining end point of titration], DE-OS 36 18 520, PCT/GB95/01425 [Improvements in or relating to electrochemical measurements]).

But a controlled pH change through redox reactions is only possible in exceptional cases, like in the system by Shimomura et al. (Shimomura, O.: J. Crystal Growth 144, 253 [1994]; Shimomura, O.: Trans. IECE Japan J 67 C, 673 [1984]; Yokotani, A., Kolde, H., Sasaki, T., Yamanaka, T. and Yamanaka, C.: J. Crystal Growth 67, 627, [1984]). This system relates to amperometric pH control in the growth of KDP monocrystals in saturated solutions in vessels of characteristic dimensions of the order of 20 to 30 cm during the course of several months, and exhibits the following drawbacks. Firstly, pH control to compensate for pH changes in the saturated solution only allows pH change in one direction because of the crystal growth. Secondly, the electrolyte of an anode region bordering on a central adjusting region is mixed with the electrolyte of a cathode region bordering on the adjusting region, with the result that anions from the anode region, especially disturbing hypochlorite ions for example in solutions containing NaCl, can penetrate the adjusting region by way of the cathode region (the same applies to the cations). Such mixing is unacceptable in many applications because of the contaminating effect. Finally, pH change is extremely slow.

A method of pH control in electrolysis processes with pH changes in the solution to be electrolyzed is known from DE-OS 1 571 723. Here there are one or two electrolyte chambers by which $H^+$ ions and corresponding counterions are injected into the solution to be adjusted to increase the pH value. Alternatively the method can be used to inject $OH^-$ ions.

The method according to DE-OS 1 571 723 presents the following restriction. No pH adjustment or Regulation is possible because pH control is slow and may only be in one direction (either an increase or decrease of the pH value).

In some applications the pH shifts on the electrodes are to be eliminated (e.g. in electrophoresis configurations), while in the following cases they are expressly wished.

In isoelectric focusing a pH gradient is generated over a separation distance by means of current flow and used for protein separation. For this purpose multi-electrode configurations were proposed, the function of which consists in producing a staircase pH gradient in an electrophoretic separaton distance (Hagedorn, R. et al.: DD 273 316; Deml, M., Pospichal, J., Gebauer, P. and Bocek, P.: Czech. Pat., PV 6036-88). This is done by making part of the separation distance acidic or basic at the expense of the other part through the effect of electric fields. A nearly stationary pH gradient can be created, which suits the requirements of electrophoretic separation but, for the following reasons, is unsuitable for pH Regulation. Firstly, the pH shifts are extremely slow because they are initiated solely by diffusion processes and chemical reactions (formation of water). Secondly, formation of the gradient is tied to immiscible media. So this system too is unsuitable for general use in pH Regulation.

BRIEF SUMMARY OF THE INVENTION

The object of this invention is to create an improved device for influencing ion concentration on an amperometric basis and a method for its operation, allowing the drawbacks of conventional systems to be overcome and permitting faster adjustment and the implementation of control circuits. A particular purpose of the invention is to create an improved pH adjusting instrument that can be used with pH control characteristics over wide pH ranges for general applications, e.g. in medicine, pharmacology, chemistry and other technical sectors.

This object is solved by the subjects of the patent claims 1, 19 and 21. Advantageous embodiments of the invention proceed from the dependent claims.

DETAILED DESCRIPTION OF THE INVENTION

The invention is based on the idea of providing a device in which, as distinct from known techniques, there are at least three electrically driven electrolyte regions with which ions can be transported selectively into an adjustment solution. An electrolyte region is a definable volume that contains at least one control electrode and can be connected to the adjustment solution or an adjusting region via a physical phase boundary (diffusion depressant, e.g. membrane, capillary, diaphragm). The control electrode is operated as an anode or cathode, depending on the function of the electrolyte region.

The invention can be used for any kinds of ion and is not restricted to adjusting pH values. The adjustment of an ion concentration also includes the possibility of at least partial substitution of an ion composition. Adjustment is preferably by forming a control circuit but, in systems with known characteristics (buffer capacity, ion transport, etc), may be performed exclusively by measuring control currents.

Electrolyte regions with which the adjustment solution can be regulated to make it acidic or basic are termed acid or base regulator. In applications for adjusting ion concentration the electrolyte regions are termed anion—or cation—acceptor or donator (or emitter) chambers.

According to a first embodiment, the device of the invention contains three electrolyte regions: (A) a region that can exchange primarily anions (especially OH ions) with the adjustment solution (in pH systems: base regulator); (B) a region that can exchange primarily cations (especially H ions) with the adjustment solution (in pH systems: acid regulator); and (C) a region that can exchange both cations and anions with the adjustment solution (in pH systems: socalled neutral phase). The chemical composition of the solutions in the regions is matched to their particular function. The electrolytes can comprise in particular weak salty solutions, distilled water, acids, bases or moistened salts.

For adjustment of pH, the acid or base regulator is operated with the neutral phase to make the system acidic or basic. The individual ion transports are as follows:

a) Regulation towards smaller pH values (acidification of the adjustment solution): the electrode of the acid regulator is operated as an anode, and that of the neutral phase as a cathode. Protons flow from the acid regulator into the adjustment solution, and accordingly cations from the solution into the neutral phase. The anions of the neutral phase move through the adjustment solution into the acid regulator and consequently are barely effective.

b) Regulation towards higher pH values (alkalization): this is an analogous process with hydroxyl ions, ie with the opposite sign.

The ion concentration or conductivity can be altered by operating either the acid and base regulators (reduced conductivity) or two neutral phases (increased conductivity) together or with another electrode in the adjustment solution.

The neutral phase is designed for operation with current reversal. To effectively prevent contamination of the adjustment solution within the time of adjustment, it is possible to provide ongoing exchange of the electrolyte at least in the neutral phase or means for reducing ion mobility (e.g. convection hindering additives like gels, highly concentrated electrolytes or moist salts) in the neutral phase. In the event of a moistened salt being used, the field strength is reduced to a minimum and ions only move very slowly.

Alternatively the invented device comprises four electrolyte regions, with two neutral phases, to prevent current reversal and thus transport of redox products of electrodes into the adjustment solution.

The invention is not restricted to the implementation of three or four electrolyte regions—it can be implemented with any number of electrolyte regions.

According to the preferred embodiments of the invention, the electrolyte regions are provided with shared holding means in pairs or all together. Depending on the application, shared holding in pairs means sharing an acid or base regulator with a neutral phase (pH adjustment) or sharing an acid and a base regulator or the neutral phases (ion adjustment).

The holding means can be formed of a support on which the electrolyte regions are attached with distance and each by one end. The holding means can also be formed of a component into which the electrolyte regions are integrated next to one another.

The defined, relative positioning on the holding means produces, in the first place, simple and joint handling (especially for immersion in the adjustment solution) of the electrolyte regions and, secondly, any selection of but constant spacing and thus constant current paths between the jointly held chambers.

The current path can be made shorter by arranging the electrolyte regions in pairs or all adjacent to one another. in this way the diffusion reducing means can be arranged next to one another. Diffusion depressants are next to one another when the side edge of one diffusion depressant either touches the side edge of another diffusion depressant or is at a distance from it that is much less (e.g. factor 0.5 or smaller) than a characteristic variable of the adjustment volume (e.g. vessel diameter).

These application-specific measures optimize the following requisites for a control circuit. Firstly, the influence on the system is as reproducible as possible because the current paths are constant. Secondly, the influence on the system is fast enough because the current paths are minimized.

According to a special form of the invention, the adjustment solution can be mixed or stirred during adjustment. Intermixing can be either active by a stirring means or passive (especially for small volumes) by diffusion. Both separate stirring devices (e.g. magnetic stirrer) and the pH adjusting instrument itself can be used as a stirring means.

Means of reducing or influencing ion mobility can be provided in at least one of the electrolyte regions. Besides materials for reducing diffusion or viscosity enhancers, diffusion depress ant structures (especially to produce a sequence of stirred, well mixed and unstirred, stable diffusion zones), several electrodes (especially with suitable arrangement, e.g. partly insulated at a distance from or close to the diaphragm) per electrolyte region and circulating systems can be provided.

As a result of the invention, particularly compact, feedback controlled pH adjusting instruments (e.g. in the form of pH electrodes) or methods are created in which jointly mounted electrolyte chambers are provided together or in separable groups and which do not alter the volume or do this by a determinable displacement in a reproducible manner, which (at constant volume) do not alter the conductivity of an adjusting region, which can stabilize the qualitative composition of the solution that is to be adjusted or adjust it specifically and detain possible electrode reaction products, or in which the solution to be calibrated must not be known in its chemical composition and may be neglected for Regulation.

A method according to the invention for amperometric adjustment of the ion concentration of an adjustment solution comprises the steps: filling of a system for amperometric ion concentration adjustment, which has at least three chamber-shaped electrolyte regions, each containing a control electrode and diffusion depressant, with a variety of electrolyte solutions, simultaneous connecting of the diffusion depressant of the electrolyte regions with the adjustment solution, and driving of each electrolyte region by a separate control current, whereby, when current flows through the control electrodes, ions are transported from the electrolyte solutions through the diffusion depressants into the adjustment solution in such a way that its ion concentration changes.

Regulation according to the invented method is such that a deviation from the desired ion concentration or pH value is measured by one or more sensors and subsequently compensated in an amperometric manner. The sensors can be ion sensors, pH electrodes or measurement means that detect the actual value indirectly by measuring an actual-value-dependent parameter of the adjustment solution, for example by optical spectroscopic measurement (e.g. absorption). The sensors will preferably have fast response. pH electrodes designed with FETs with response times of the order of 1 s are consequently especially suitable.

The following characteristics and advantages can be realized by the invention, but not by previously known systems:

The ion composition (e.g. the pH value) can be adjusted fast (millisecond to minute range, hours in exceptional cases) and sufficiently accurately ($\frac{1}{10}$ to $\frac{1}{100}$ pH and better). The conductivity of the solution can be regulated.

Any volumes (milliliter to microliter or less) can be adjusted simply by producing a fluid contact with the diffusion depressants or partial immersion. The volume of the solution is not or only slightly altered by the adjustment operation. The system can also be operated as a continuous flow system.

Redox processes on the electrodes are decoupled from adjustment of the ion concentration. The adjusting region is connected to the electrolyte regions by phase boundaries. Consequently the adjusting region contains no electrodes, with the exception of possible sensor electrodes. The solution to be adjusted (adjustment solution), the composition of which may be unknown, is not consumed by the adjustment process or contaminated by redox products. Disturbing redox products on the electrodes are generally excluded from the adjustment solution by sufficient isolation and, in a device with four or more chambers, by the unchanged polarity of the chambers during operation.

An easily handled and electronically controlled, possibly programmable system can be constructed for use in any kind of vessel. The system is stable longterm and, at least in its essential parts, reusable and possibly exchangeable. Compatibility is possible with conventional laboratory systems of any geometry (e.g. socalled Eppendorf tubes) or electrical function (e.g. pH meters, voltmeters). The system can be created in pin form, for example, with subchambers, possibly combined with a regulating vessel or extremely miniaturized. Commercial pH electrode terminals or complete sensor systems (FET electrodes, glass electrodes, etc) can be used to form a control loop (determination of pH). The system is regenerable. As in conventional pH acid base adjustment, analog recording of the regulating procedure is possible like a titration record. Fixed pH values can be adjusted, or pH programs can be run like pH steps, pH stairs, characteristics with linear, exponential or other timed rises and falls, or iterative characteristics and characteristics with repetitive features.

Ion concentration adjustment is not by a chemical reaction but by transport of substance into the adjusting region. The space between the electrolyte regions with the (control) electrodes can be set to any constant value without losing pH Regulation capability. This allows compact design with bordering electrolyte regions or pH instruments with separable, compact subsystems, each with bordering electrolyte regions.

The device can be seen as an electronic buffer in which the buffer effect, otherwise produced by chemical means, is regulated electronically, which does not exclude the possibility of adjusting buffered solutions.

BRIEF DESCRIPTION OF THE DRAWINGS

Particular embodiments of the invention are explained below with reference to the attached drawings, which show:

FIGS. 1a and 1b: a first embodiment of a device according to the invention;

FIGS. 4a, 4b and 4c: a further embodiment of a device;

FIGS. 5a, 5b and 5c: a further embodiment of a device;

FIG. 6: a further embodiment of a device for miniaturized applications;

FIGS. 7a and 7b: a further embodiment of a device for miniaturized applications;

EXAMPLES

Figure 2:
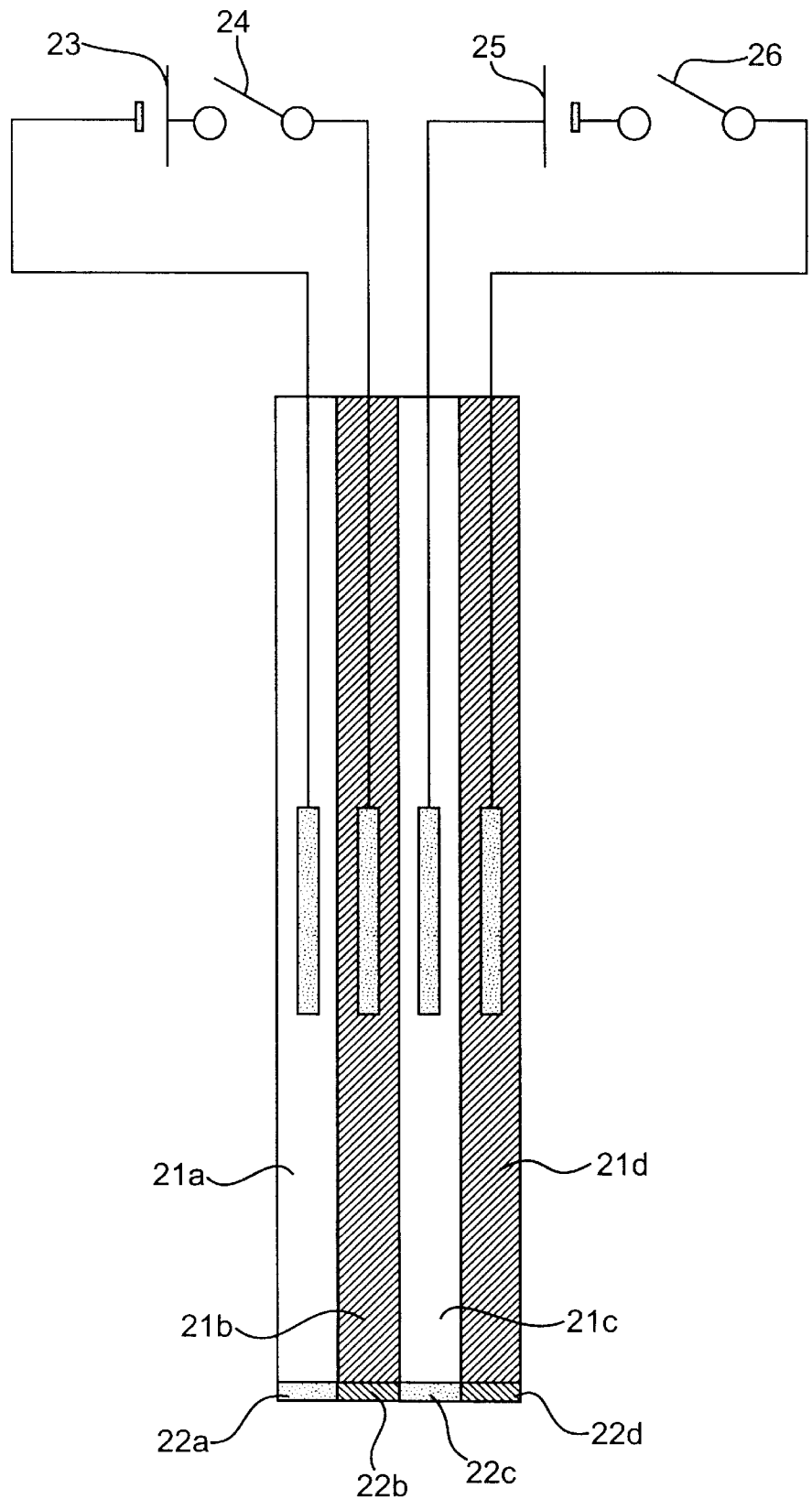
FIG. 2: an example of circuitry of a device according to the invention.

The following examples are described with reference to pH adjustment, but are also applicable to ion concentration adjustment by operating the electrolyte chambers in a corresponding changed manner.

Because of the dependence of control characteristics on adjustment volume, it is best to explain examples of implementation of the invented device with reference to three ranges of adjustment volume. This is simply for the purpose of clarity and does not imply restriction of features to the particular examples. The ranges are:

Range 1: volume greater than 10 ml (FIG. 1 to 4)
Range 2: volume between 0.1 ml and 10 ml (FIG. 5)
Range 3: volume smaller than 0.1 ml or in microscopically small systems (FIG. 6 and 7)

Whereas devices for use in ranges 1 and 2 are generally produced by conventional manufacturing means (milling, drilling, die-casting, etc), in range 3 in particular microstructure engineering techniques are used with resolution in the $\mu$m region or below, especially semiconductor technologies.

FIG. 1 shows schematically an exploded view of a modular, compact pH regulating pin device (or stud or terminal) (FIG. 1a) and a composed view of the system (FIG. 1b).

The pin comprises a sensor and diaphragm cap 11 (hereafter: cap 11), an electrolyte chamber module 13, electrolyte cartridges 14, electrodes 16 and an interface module 17, which can be connected to (possibly programmable) constant-current sources 19 or microprocessor or computer control 110. The electrolyte regions of the invention comprise parts of the cap 11, the cartridges 14 and the electrodes 16. The diaphragms 12 are provided as a diffusion depressant. The electrolyte cartridges 14 are only represented schematically. At their bottom end (as positioned for operation) they have means of producing fluid contact with the diffusion depressant. The bottom end can be matched to the suitably formed inside of the cap 11, possibly using separator elements that are permeable to fluid.

The electrolyte regions can be filled as follows in all embodiments. Two chambers form the acid and base regulators, which are filled with an acid or base respectively whose concentration is chosen for the particular electrolyte function. Consequently the concentration can vary considerably according to the application and reduce to the extent that an acidic or basic character is no longer present. Both regulators can be filled with water for example. Two further chambers form the neutral phases, which are filled with an electrolyte of such a concentration that the donator function of the neutral phases can be fulfilled and possibly buffer has to be replaced in the neutral phases. The neutral phases can be filled with a highly concentrated buffer for example.

To set a known buffer solution for instance (e.g. 0.1 mole tris/HCl), the neutral phases are filled with highly concentrated buffer (e.g. saliniform tris buffer with concentrated hydrochloric acid, pH=7). The base regulator contains 0.02 M NaOH solution. The acid regulator contains 0.02 M $HNO_3$ solution. To set an unknown solution for example, the neutral phases are filled with highly concentrated $NaNO_3$ solution, the base regulator with 0.01 M NaOH solution, and the acid regulator with 0.01 M $HNO_3$ solution. For a weak buffering, otherwise unknown solution, the procedure is as in the latter case, but with a more diluted neutral phase (e.g. 1 M $NaNO_3$ solution). Further examples are given below.

The electrolyte chamber module 13 consists of the four chambers into which the cartridges 14, filled with the different electrolytes, are inserted. Gases produced when current is applied to the electrodes 16 escape through the gas expeller apertures 15. In operation the diaphragms 12, each linked to a cartridge 14, represent the phase boundary between the electrolyte chambers and the solution. Further diffusion barriers or separator elements like membranes may be inserted in the cartridges 14 for extra separation of the region in direct contact with the electrodes 16 from the solution 10.

The following three membrane combinations can be used in the four-chamber pin:

(i) identical diaphragms or diffusion depressants on all chambers;

(ii) a cation exchanger membrane on the acid chamber (acid regulator), an anion exchanger membrane on the base chamber (base regulator), and a diffusion depressant, named under (i), on the neutral chambers (neutral phase);

(iii) one cation and one anion exchanger membrane on the acid regulator and the first neutral phase, and one anion and one cation exchanger membrane on the base regulator and the second neutral phase.

Other combinations are possible.

Seated on the electrolyte chamber module 13 is the electrode module, here with four electrodes 16 (partly insulated) and a pH sensor 18, so that the electrodes immerse in the electrolyte chambers (cartridges 14) and the pH sensor 18 extends into the cap 11 through a central opening and can be brought into direct contact with the solution. It can also be attached to the exterior, however, or integrated in another way or have a conductivity sensor added to it. It is best to use temperature-compensated sensors. The interface module 17 establishes electrical contact with the electronic control and includes a circuit, e.g. a diode network, to prevent polarity reversal. In addition to the microprocessor or computer control 110, the pin is supplied with the necessary current by one or more constant-current sources 19.

In operation only the cap 11 has to be in contact with the adjustment solution 10 (refer to FIG. 1b). All other parts can but must not be immersed in the solution to be adjusted. The cap is of a diameter that matches the size of the adjusting region. The diameter should be less than 15 mm for the matching of standard components (e.g. covers).

The electrodes 16, the electrolyte cartridges 14 and the cap 11 are consumables and can be replaced fast and simply. The electrodes 16 can be of carbon (e.g. electrode hard coal), conductive plastic materials, platinum, gold, refined steel and the like or have appropriate coatings. The electrodes 16 can be in wired form or flat. The electrodes 16 can be integrated on the inner walls of the cartridges, e.g. as a coating. Exchangeable solution cartridges, which may be ready filled with a standard solution of specified ion composition, are used in diagnostic medicine and pharmacological applications for example, as well as in water deliming systems.

The cap can also be designed as a flat disk, especially suitable for use in a very small volume (see below), because this form can be miniaturized and only has to set down on the meniscus of the solution. This means that there is virtually no displacement of the solution and good control characteristics. The cap is also easy to rinse, which is an advantage in routine laboratory applications.

Most requirements in laboratory operations can be satisfied with the four-chamber pin. But both simplified and expanded versions are conceivable for special applications. The advantage of the four-chamber pin system is that all components extracted from the solution remain in the pin. Consequently, in the course of further use, the subsequent solutions are not contaminated. This applies in particular to the neutral phases, which are operated as cathode or anode in the four-chamber version, but not alternating as cathode and anode. If contamination with anions or cations of an earlier solution is insignificant, or other steps are taken to prevent contamination, a three-chamber pin can be used for pH Regulation. This consists of an anion collector, a cation collector and a combined anion/cation emitter (joint neutral phase).

A conductivity sensor can be dispensed with if conductivity is not of interest.

The electrodes have no direct contact with the adjustment solution and possible reaction products on them (e.g. radicals) are unable to enter the solution 10 or, if so, only in an extremely weak concentration.

The chambers are filled by appropriate supply means (pump, syringe, etc). The chambers of the electrolyte regions may also be designed like plungers, however, so that the solutions are sucked up like in a syringe.

The cap 11, the electrolyte chamber module 13 and parts of the interface module 17 form means of holding and handling the electrolyte regions. The diaphragms are arranged close together to minimize the current paths.

The example in FIG. 2 is a schematic of the circuitry of the invented device. The four electrolyte chambers 21$a$–$d$ are filled with NaOH (21$a$), NaNO$_3$ (21$b$), H$_2$SO$_4$ (21$c$) and NaCl (21$d$) for pH adjustment. With the voltage sources 23 and 25, the electrodes of chambers 21$a$ and 21$d$ are wired as cathodes and those of chambers 21$b$ and 21$c$ as anodes. The diffusion barriers comprise an anion exchanger 22$a$, a cation exchanger 22$c$ and dialyzing membranes 22$b$, 22$d$. The ion exchanger and dialyzing membranes that are used are approx. 0.5 mm and 0.1 mm thick respectively. But other thicknesses can be chosen. If the pH value is to be set acidic, switch 24 is closed. If the pH value is to be set basic, switch 26 is closed. Other circuitry variants and fillings can be selected according to requirements. Operation is at voltage levels chosen according to adjustment volume, conductivity and the design of the device. For the above mentioned ranges 2 and 3 the voltage can be smaller than 100 V, preferably less than 42 V, but it may also be higher than 100 V. An important advantage for use in the laboratory is the possibility of operating the invented device on harmless small voltages. Operation with the presented examples used constant-current sources (voltages depending on operational phase approx. 30 to 60 V).

Figure 3:
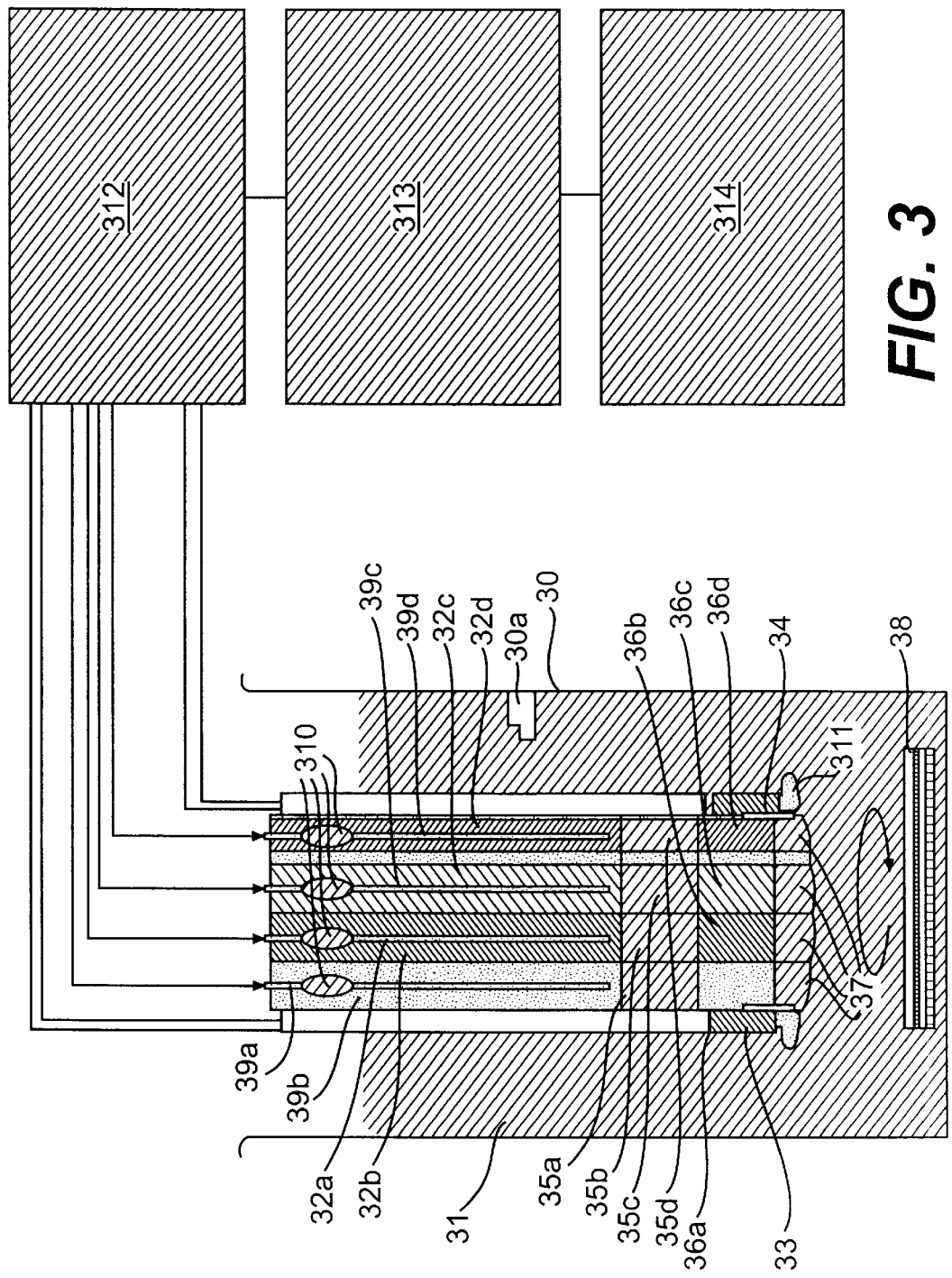
FIG. 3: a further embodiment of a device.

A further example for range 1 is shown as a sectional schematic in FIG. 3. Reference numeral 30$a$ indicates a holder being a part of the inner wall of the beaker 30. The holder 30$a$ is adapted to provide a common holding means for the electrolyte regions. A compact pin for regulating the pH value of the solution 31 is positioned in a vessel which here is a beaker 30. The pin is designed as a four-chamber system and contains the following elements. There are four control electrodes 39$a$–$d$ to form the ion currents. Two are wired as an anion and a cation collector, the others as an anion and cation emitter. The ion currents pass through the different compartments of the pin 32$a$–$d$, 35$a$–$d$ and 36$a$–$d$, the diaphragms or membranes 37 and the solution 31 that is to be regulated. The compartments contain further diffusion barriers 35$a$–$d$ and gas expeller apertures 310. The compartments are filled with at least two different electrolyte solutions. The pH electrode 34 and conductivity sensor 33 serve for detecting the actual values in Regulation of the pH value or conductivity.

It may be necessary to screen the sensors against the control field (indicated here by the ring 311), or measurement and Regulation are alternated. It is best if the solution 31 is mixed (e.g. magnetic stirrer 38). The regulation pin is connected to the electronic, directly controlled member 312, the computer interface 313 and the computer or microprocessor 314. But the system can also be configured with a commercial pH meter and controller. In this way complicated pH functions can be preset (also stairs, steps, etc). Complex pH programs may also be run and the ion currents necessary to change the pH value can be registered and evaluated at the same time (similar to the methods with titration curves).

Of the entire system, only the diaphragms and sensors must be immersed in the solution 31 during operation, so pins of this kind in flat design only have to be set on solutions, gels, etc to regulate their pH.

In FIG. 3 the electrolyte chambers are shown as a row for more clarity. In practice however they are integrated in space-saving manner in an outer jacket that forms the holding means. The diaphragms 37 can be formed of a single piece of membrane that at the same time covers the adjacent outputs of the electrolyte regions and is attached to the walls separating the electrolyte regions.

Another embodiment for above range 1 is shown in FIG. 4. In this case it is a three-chamber pin.

FIGS. 4$a$ and 4$c$ show two side views (turned through 90°) of a pH regulating system according to the invention. The handle part 41, which contains three chambers (base and acid regulators and neutral chamber), is sealed at the top by the cap 42. Attached to the cap 42 are three electrodes (not shown), which protrude into the chambers in the handle 41. The electrodes are driven via the feed cable 43, consisting of the electrode leads and the pH electrode wiring (pH electrode not shown). The cap 42 is provided with ventilation holes for the chambers. The cap can be removed to load the system.

Protruding from the bottom of the grip 41 are parts of the electrolyte regions 44 and 45, which are arranged for contact with the adjustment solution (plan view in FIG. 4$b$). The acid and base regulators 45 are each tubular components that have a diaphragm as a diffusion depressant on the side facing the neutral phase 44. The neutral phase 44 is terminated by a diaphragm in the direction of the acid and base regulators 45. The diaphragms assigned to the regions 44 and 45 are spaced at a distance d, which is much smaller (e.g. factor 0.5) than a characteristic variable of the adjustment volume (e.g. vessel diameter). In operation a correspondingly short current path is created in the adjustment solution across the space d. The system can also be designed with three diaphragm cylinders or other geometries. The neutral phase 44 can be divided into two subchambers to implement a four-chamber pin.

Depending on the adjustment volume, the dimension a is 10 mm to 500 mm, the dimension b 10 mm to 1000 mm, and the dimension c 100 mm to several meters. The spacing d varies between 1 mm and 100 mm.

An embodiment for above range 2 is shown in FIG. 5a–c.

In the side view of FIG. 5a (pin for volume of 0.1 ml to 10 ml), 51 indicates the handle containing four chambers (base and acid regulators and neutral chambers), 52 the cap or electrode holder and 53 the feed cable. From the bottom of the handle 51 a longish guide element protrudes into which connecting channels between each electrolyte chamber and its diaphragm are integrated and which ends in the pyramid-shaped diaphragm head 54, 55.

The dimension of the diaphragm head 54, 55 is minimized to match the adjustment volume. The diaphragm head 54, 55 consists of four separate diaphragms forming a pyramid. 54 and 55 designate different kinds of diaphragm (e.g. dialyzing membranes and ion exchanger membranes). It is sufficient to immerse the tip formed of the diaphragm head 54, 55 in the solution in operation of the invented device. FIG. 5b is a plan view of the handle from below with the diaphragm head 54, 55. The four separate diaphragms can be distinguished, two of which are provided for feeding in protons and hydroxyl ions especially in pH Regulation. The other diaphragms form the phase bound aries with the neutral phases.

The typical dimensions of a are between 10 mm and 1 mm, of b between 100 mm and 5 mm, and of c between 300 mm and 20 mm. The dimension d is typically in the range 15 mm to 1 mm .

As an alternative to the pyramid-shaped or pointed design, the solution to be adjusted can also be drawn into a hollow tip 58 according to FIG. 5c, with three or four membranes 57 on the inside (only two are shown here), by a conventional lifting mechanism (opening 56). The adjustment solution can be mixed by vibration or, if the volume is very small, by diffusion.

Use of the amperometric principle allows miniaturization of device components down to $\mu$m size. Generally it is possible to dispense with some of or all the diaphragms. The diaphragms are replaced by appropriately designed, diffusion depressing channels/apertures. The function of the diffusion depressant means (diaphragm head or cap acc. to FIG. 1) is assumed by three or more capillaries (e.g. glass capillaries with an opening diameter in the $\mu$m range or less). The strong inhibition of diffusion by the capillaries makes it possible to do away with diaphragms entirely. Such systems, in conjunction with a FET proton sensor (e.g. size 50 $\mu$m×50 $\mu$m), can be designed as a capillary complex that is inserted in a drop of solution and detects and regulates its pH value. Preferred applications for this design are cytobiology, especially techniques involving manipulation of ovocytes and sperm, etc, and gene technology. The system is also suitable for generating pH gradients of microscopic extension.

Embodiments for above range 3 are shown in FIGS. 6 and 7a, b.

In FIG. 6 the chambers assigned to the electrolyte regions are replaced by capillaries or microchannels 61a–d for example. The arrangement of the chamber systems and diaphragms is best altered for the purpose, ie essentially planar grouping of the electrolyte chambers around a central region 66 where the adjustment solution is located. In this way it is possible to create very small arrangements with fast response and Regulation (milliseconds to seconds). The sensors (pH field-effect transistor 64 and conductivity sensor 63) as well as the drive electrodes 62a–d can be integrated into such small systems by semiconductor engineering techniques. 67 and 68 designate the inflow and outflow of the adjustment solution. Depending on size, the capillary or microchannel apertures can again be sealed with diaphragms. Instead of the planar arrangement, volume-shaped (especially globular) or linear arrangements around the region with the adjustment solution are possible.

An alternative form of head 71, in semiconductor technology on a silicon or glass base, is shown in FIG. 7a, b. There are planar gold or platinum electrodes 72a–d, $\mu$m or sub-$\mu$m range thickness, in four microchannels. The four microchannels taper to an opening 73 in the chip. In the miniaturized form the tapers create the diffusion depressant means as a phase boundary between the electrolyte regions and the adjustment solution. A drop of solution in the region of the opening 73 can be regulated in its pH value or ion composition (pH sensor not illustrated here).

The typical dimensions of a are between 2 mm and 1 $\mu$m, of b and c between 50 mm and 100 $\mu$m. The size of the system and the very thin capillaries (a few $\mu$m in diameter at the exit) allow pH adjustment virtually without macroscopic development of gas on the electrodes. The channel openings may be made larger if they are partially filled with diffusion depressant means.

As a modification for handling like a compact pin, the chip can be attached to a carrier 74 (FIG. 7b) that has subchambers and contains the three or four kinds of solution. The adjustment solution is mixed by vibration of the carrier or solely by diffusion.

Microvessels can be mixed in different ways, e.g. by means of a vibrator, a stirrer, by movement of the regulating device itself or by moving the solution receptacle.

A further example, preferably for use with systems for the above range 1, but without being restricted to this, is combination of an amperometric adjustment device with conventional acid/base means of titration. Here it is best if coarse Regulation is by conventional titration and fine Regulation by amperometric means.

In another example, the electrolyte chambers are integrated into the walls of receptacles (beakers, cuvettes, tubes, pipettes, etc) next to one another or spaced apart. The wall then forms the holding means to ensure constant current paths. A device modified in this way is not intended to be dipped into the adjustment solution but to pick it up. The receptacles are easily connected to and disconnected from a control system. This form is of advantage for examining pH-dependent characteristics of a component of the adjustment solution (e.g. enzymes) by optical spectroscopic means for instance, the adjustment solution being filled into the receptacle for executing a pH program.

In another example, devices as invented are configured as continuous flow arrangements. This can refer to both the adjustment solution and the electrolyte chambers. Because of the fast control rate, the adjustment solution can flow past the phase boundaries with the electrolyte chambers and thus be adjusted. On the other hand, constant renewal of the electrolyte chambers is preferred in systems where there may be a loss of buffer substance through redox reactions. The continuous flow system of the electrolyte chambers produces at the same time reproducible longterm stability of the control system.

The invention also shows a pH adjusting instrument with combinations of several pH pins in an open or chambered vessel for generating pH values or pH gradients.

The following modifications of the arrangement and/or connection of the electrolyte regions are conceivable.

The electrolyte regions or the corresponding chambers must not be identical in design, they can be of different volume and/or shape. The device is not restricted to the pin form.

The electrolyte regions can be implemented with suitable dialyzing tubes and inserted control electrodes. The dialyzing tubes can be fixed in the adjustment solution.

The electrolyte regions can be partially connected to one another so that a current can flow between the chambers that is not intended for the solution to be adjusted. This allows convenient, electrical preconditioning of the chambers as well as regeneration (compensation of pH values).

The chambers (especially the neutral phases) may have a shared overflow so that, by transferring a small part of the solution of the particular chamber, the acidic component of the chambers is mixed with the basic one . This can be done in different ways, e.g. by reversal of the pin and overflow of the chamber, by electric osmosis where the volume of one chamber is increased at the expense of the other chamber, by active opening of a valve between the chambers, by inserting a diaphragm in the chamber wall, by routing gas bubbles produced by electrolysis in the electrolyte regions through a duct system so that they conduct part of the electrolyte solution and transfer it to another electrolyte region and/or other chambers, or by using a compartmented chamber filling (gel fluid) of which only certain fluid regions can mix.

The last mechanism in particular can be implemented very easily and without moving mechanical parts in the pin version of the device and regulates precisely when the pin is used. In other words, if Regulation is more into the acidic region, the feedback comes from the chamber that is more heavily loaded.

Appropriate intermixing and volume transfers may also be used for the other chambers, but not between the donator chambers and the other anion/cation acceptor/donator chambers. In view of this, one or more combined anion/cation acceptor/donator chambers are preferable, because then the acidification or alkalization is canceled again within certain limits by follow-up regulation.

The electrolytic composition of the solution to be calibrated can also be modified by the invented device. If, instead or in addition to the actual pH Regulation, ion types are to be substituted, a separate electrolyte chamber is needed for each ion to be substituted. Depending on the number of substitutions required, the number of electrolyte chambers can be far more than three (cf FIG. 1). Conceivable variants would then have up to ten or more individual, electrically driven chambers, each connected to the solution for calibration by a diaphragm. Here too, inexpensive one-way arrangements can be implemented.

The invented device can be loaded by first filling the proton and hydroxyl ion donator chambers and/or the other pin chambers with the same uniform solution, which may be distilled water for example, and then operating the system in a loading step in a conditioning electrolyte solution until the ion compositions of the electrolyte regions differ in predetermined manner. The loading step follows a programmed procedure in which all control electrodes are used one after the other or at intervals, taking the currents into the control electrodes as a measure of the progress of the procedure. The pin chambers become different in their ion composition through a specified control program. After that the device can be used for any solution. Conditioning is also possible in any other solution. The control response and capacity are then somewhat poorer to begin with, but improve rapidly until a stable operating state is achieved. The possibility of later degradation through over-acidification or over-alkalization of the donator chambers can be limited or prevented by the regeneration device already explained.

The adjustment device can be designed as an inexpensive one-way or exchangeable system. Exchangeable caps can be used to hold diaphragms or membranes, these containing the required membrane regions and being simply attached to the ends of the electrolyte chambers in the form of tubes, ducts, pipes, etc.

Another variant is a pH pin in which the diaphragms are replaced by ion exchanger membranes. The membrane permeability reduces the number of ion types contributing to the overall current. In this way the pH changes can be detected quantitatively and titration curves produced by current measurement can be obtained. Enzymatic applications also require temperature Regulation. Therefore, as in all other applications, at least one temperature sensor can be integrated in the pin.

Figure 8:
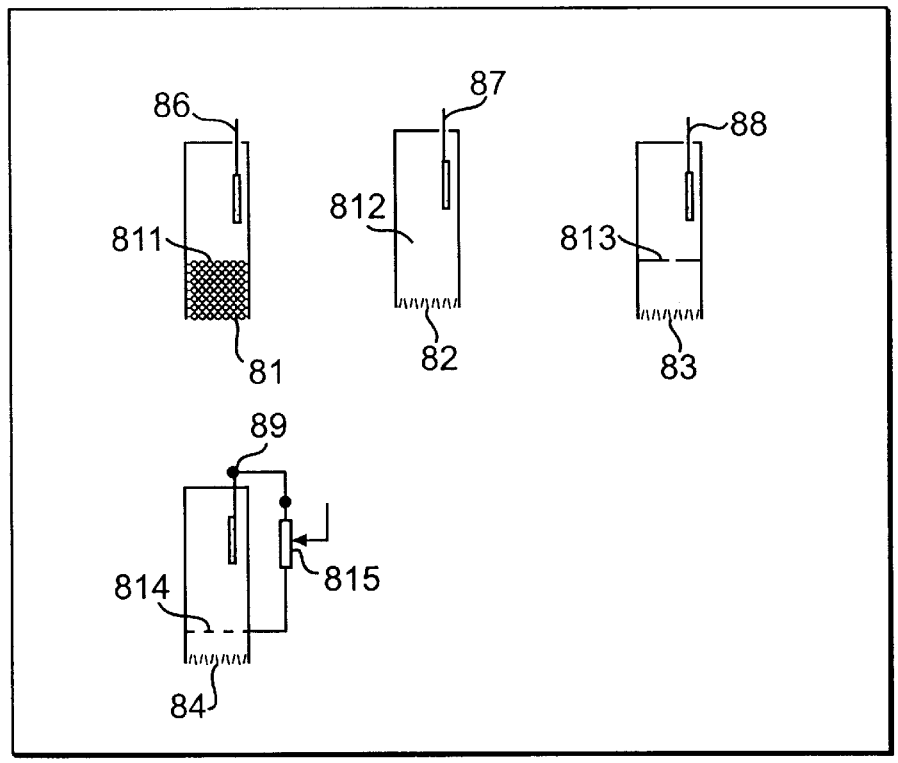
FIG. 8: configurations of electrolyte regions, provided for improved reduction of diffusion and electrolyte regeneration.

FIG. 8 shows different constructions for depressing diffusion in the electrolyte regions and for buffer exchange so that redox products created on the electrodes and possibly charged are prevented from leaving the electrolyte regions. Each of the chambers shown has a phase boundary (e.g. membranes 81 through 84) and a working electrode (86 through 89). Diffusion depressant regions are formed by one of the following measures: a fixed region 811 of gel pellets, solid electrolyte crystallites or the like, a membrane 812 (e.g. an ion exchanger membrane), a reducer 813 or a second, porous electrode 814 connected to the working electrode by a potentiometer 815.

Devices of the kind invented can be linked to Regulation that sets the currents through the control electrodes. The purpose of the control circuit is to generate a positive or negative output current for each control electrode if there is a deviation from the setpoint. This current should correspond to the difference from the setpoint. Socalled PID controllers are suitable for this purpose, with a control response produced from a proportional (P), an integral (I) and a derivative (D) component. PID controllers can be implemented as hardware or software. Operational amplifier circuits are adequate for most routine tasks, while a computer should be used for more complex control. The serial computer interface can serve to detect the pH value and the printer interface to output the control value. Any conventional PC is suitable for this. Separate or networked, directly controlled members form the pH Regulation, the conductivity Regulation and possibly temperature regulation.

Control can be such that the control currents are recorded, indicated and compared to the setpoint, the control currents being held differently in the individual chambers or control becoming finer by reducing the currents with increasing proximity to the setpoint. The control can be combined with the supply of control DC currents by the circuit.

The devices invented allow simple cleaning or sterilization. They may be cooled and operated with currents in the mA to A range, so large volumes in the liter to cubic meter range and more can be adjusted, e.g. swimming pools, aquariums or washing machines.

Measures for increasing the control rate are an increase of the concentration of the solutions in the chambers for example, an increase of current and/or enlarging the diaphragms relative to the volume of solution.

Regeneration can be produced by an intermittent and/or partial connecting or continuous or discontinuous exchange of the fluids in the proton donator and hydroxyl ion donator chambers. This can be an overflow or also involve active exchange principles. But only part of the solution is transferred, no complete intermixing is aimed at.

Regeneration may also be achieved as follows. The two proton and hydroxyl ion donator chambers for pH Regulation of a solution are effective when more protons are issued to the solution per unit in time from one chamber than hydroxyl ions from the other (and vice versa). If the difference is zero, the pH value of the solution for adjustment remains constant. The sense of pH change is thus defined by the dominant chamber.

In the course of Regulation one of the donator chambers (acid regulator) becomes more acidic and the other donator chamber (base regulator) more basic. If electric osmosis occurs or individual parts of the device (e.g. diffusion barriers) are damaged, which is possible in extreme conditions of operation, one of the following countermeasures can be implemented.

Firstly, it is possible to configure two or more electrodes in each electrolyte region (cf FIG. 7), one of them near and the other farther away from the physical phase boundary. Both electrodes are on different potential, that electrode farther from the phase boundary exhibiting the higher potential. The difference in potential leads to a field strength gradient that is suitable for keeping redox products away from the phase boundary.

Secondly, the chambers can be supplied with fresh electrolyte solution continuously or discontinuously by an appropriate pump system.

Thirdly, it is possible to supply all electrolyte regions (e.g. acid and base regulators and the neutral phase) with an electrolyte from a common reservoir followed by an amperometric modification means (cf FIG. 8). The modification means is provided so that the electrolyte exhibits a suitable composition before the individual chambers are filled. This creates a dynamic, simply designed and possibly regenerable system that is easily matched to a concrete application.

Figure 9:
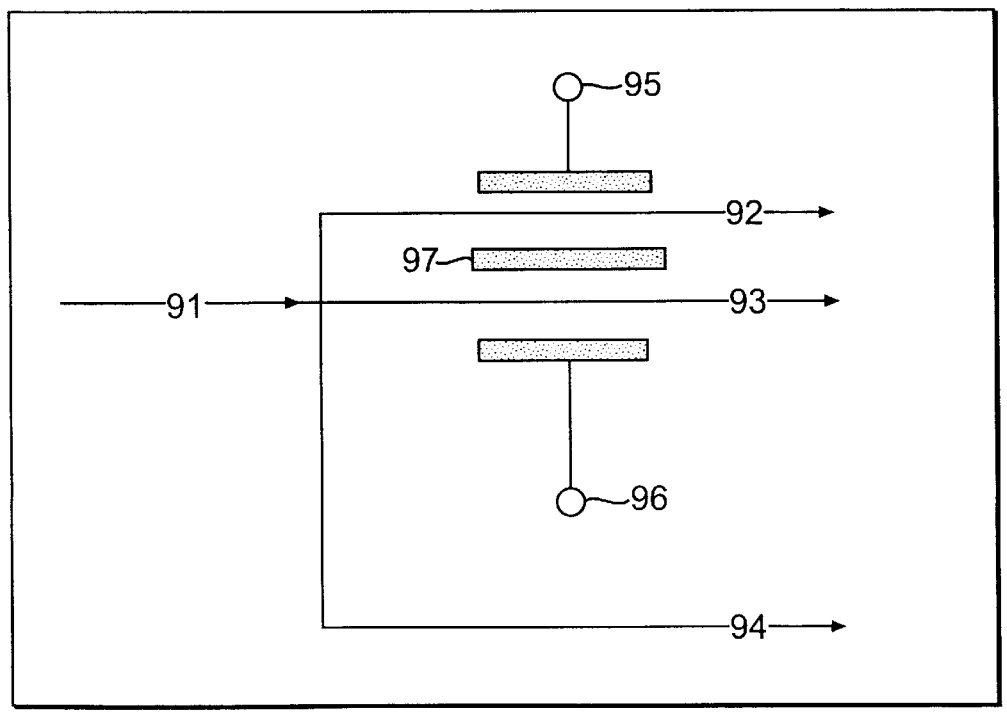
FIG. 9: arrangement for preparing electrolyte chamber filling for adjusting instruments according to the invention.

FIG. 9 illustrates the principle of this regulation. An electrolyte current 91 from the reservoir is split into part currents 92 and 93, which are fed past the anode 95 and the cathode 96 under the effect of the field. A diffusion barrier 97 prevents mixing of the part currents 92 and 93. As a result of charge transport the part current 93 is basic after passing the field and the part current 92 acidic. The part current 94 retains its original pH value. If the dwell time in the field is selected appropriately, one obtains three electrolyte solutions for filling an acid regulator, a base regulator and a neutral phase.

Electrolyte regeneration by electronic or mechanical/electric means is performed either before using the pH instrument or possibly automatically during operation or in operating intervals.

After a long period of non-use (hours, days, months) and for regeneration in the case of less concentrated electrolyte solutions (acid, base and neutral chambers), the diaphragms, if they are dried out, are swelled up before starting operation in a watery solution according to specifications. In the case of high concentrations, especially in the neutral chambers, alteration or destruction of the membranes through crystallization can be prevented by a cover during storage and/or means of increasing humidity to more than 90%. Other possibilities are immersion of the chambers in appropriate solutions that allow none or only little osmotic alteration of the chamber interior, or regeneration of individual chambers by smaller current flows than used during regulation, possibly by one or more electrodes in the storage solution and the chamber electrodes.

Measures can be provided for detecting consumption or exhaustion of the electrolyte regions, especially the neutral phases. In systems with known characteristics these measures can comprise current measurement and separate summing of the current that has flowed through each chamber. Alternatively, exhaustion can be detected by observing the control rate.

Examples of experimental results with invented devices are described below.

According to Faraday's Law, only a certain quantity of ions can be transported per current unit. In the case of pH Regulation, monovalent ions (protons and hydroxyl ions) are of particular interest. The time for adjusting the pH value of a solution therefore depends on the pH range and the buffer capacity. For this reason the pH value or the ion concentration can be adjusted fastest in unbuffered solutions.

Figure 10:
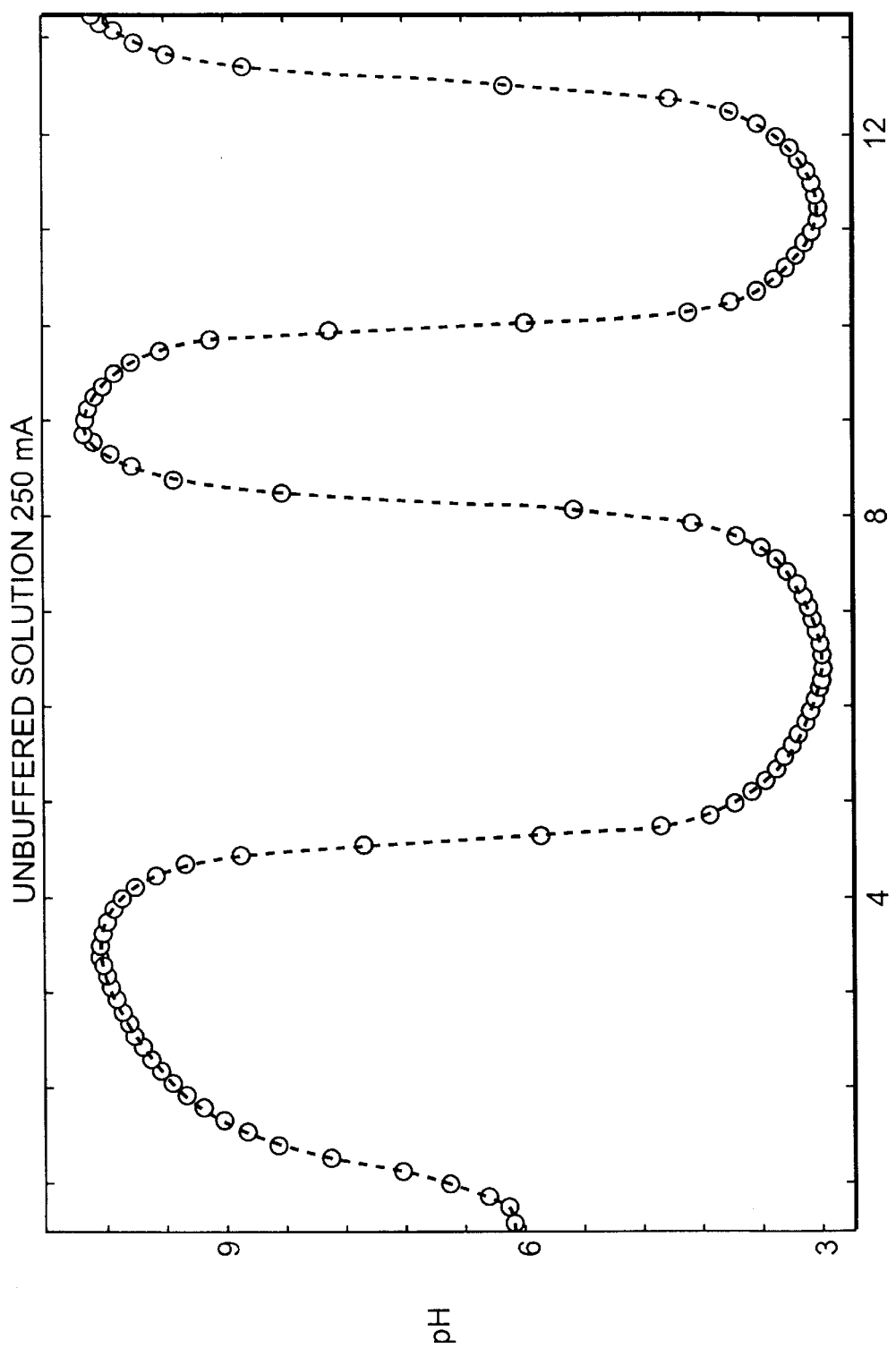
FIGS. 10–13: curves of examples of pH value regulation according to the invention.

Typical pH Regulation with alternating pH rises and falls between two extremes in 100 ml of tap water at a current of 250 mA is shown in FIG. 10. With good mixing of the adjustment solution, shift of one pH unit is completed in a few seconds. In the pH range below pH4 and above pH10 the control times become longer because of the exponential increase in ion quantity (refer also to FIGS. 11 through 13).

Figure 11:
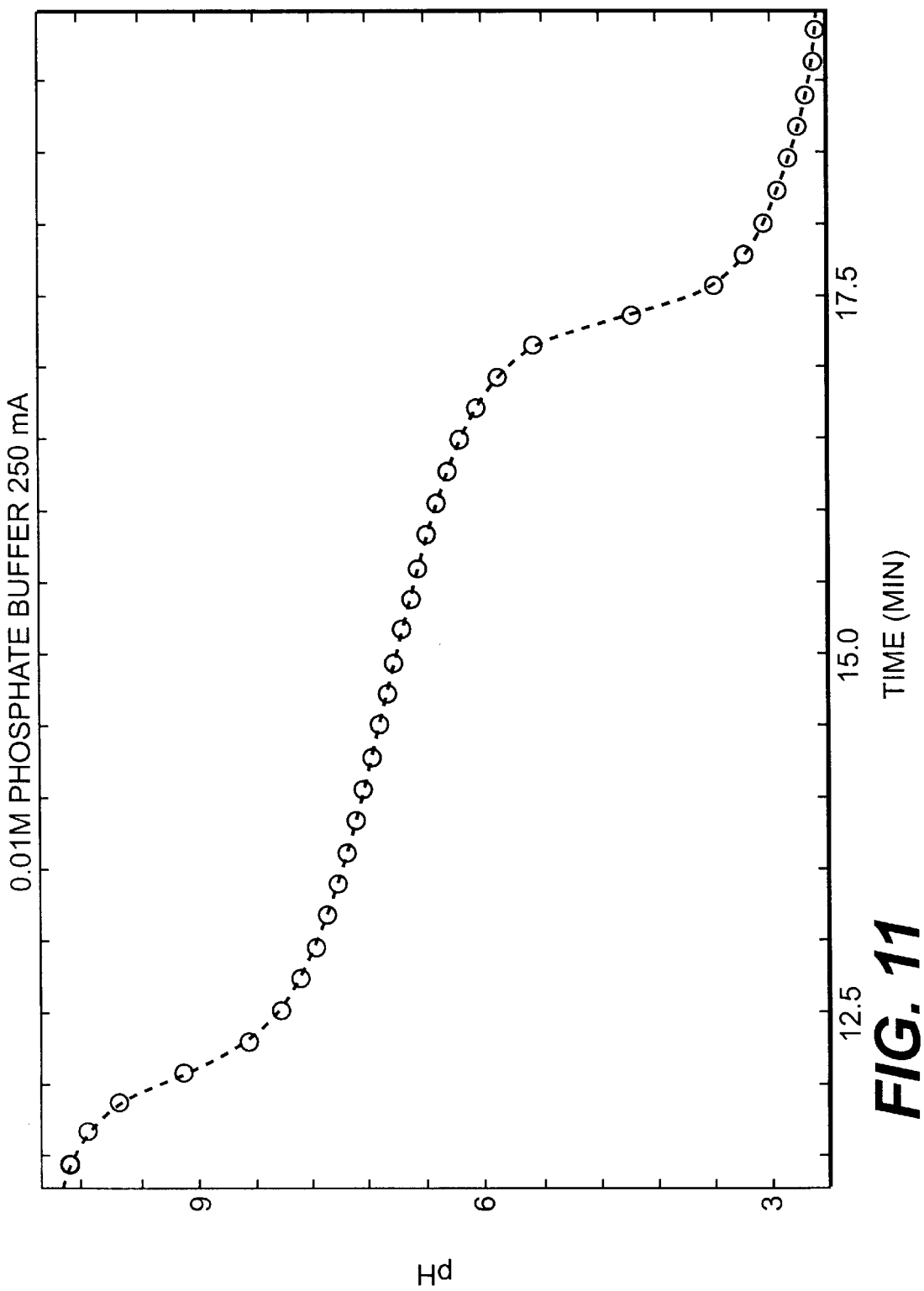

The curve in FIG. 11 shows the typical adjustment times in 80 ml of a weakly buffered solution (0.01 M phosphate buffer) at a constant current of 250 mA, ie for constant ion inflow. This result was achieved with a pin with the following features:

| a) | Four chambers with the following fillings and volumes | |
|---|---|---|
| | acid regulator | $H_2SO_4$ (0.01 M), 3 ml |
| | base regulator | NaOH (0.01 M), 3 ml |
| | 1st neutral phase | $KNO_3$, saturated solution with crystallized bottom filling, 4 ml |
| | 2nd neutral phase | $KNO_3$, saturated solution with crystallized bottom filling, 4 ml |
| b) | Diaphragms: | four identical dialyzing membranes each 1.5 $cm^2$ in area |
| c) | Electrodes: | four platinum wires of 0.5 mm in diameter and 30 mm long, each immersed in a chamber |

One of the neutral phases was operated against the acid regulator and the other against the base regulator. In this way each chamber maintains its polarity and is simply cut in or cut out. About two thirds of the diaphragms were immersed in the adjustment solution in a 100 ml beaker. Anions and cations of the solution pass into the neutral chambers but do not leave it again. pH measurement was made by a temperature-compensated, field-effect-transistor pH electrode. Regulation was interrupted every 10 s for 2 s to determine the pH value and then restarted. The adjustment solution was mixed by a magnetic stirrer.

The lengthening of the adjustment times (flat part of the curve) is easily distinguished in the buffer region and also at low and high pH. This results from the exponential increase of protons or hydroxyl ions to be electrically titrated.

Figure 12:
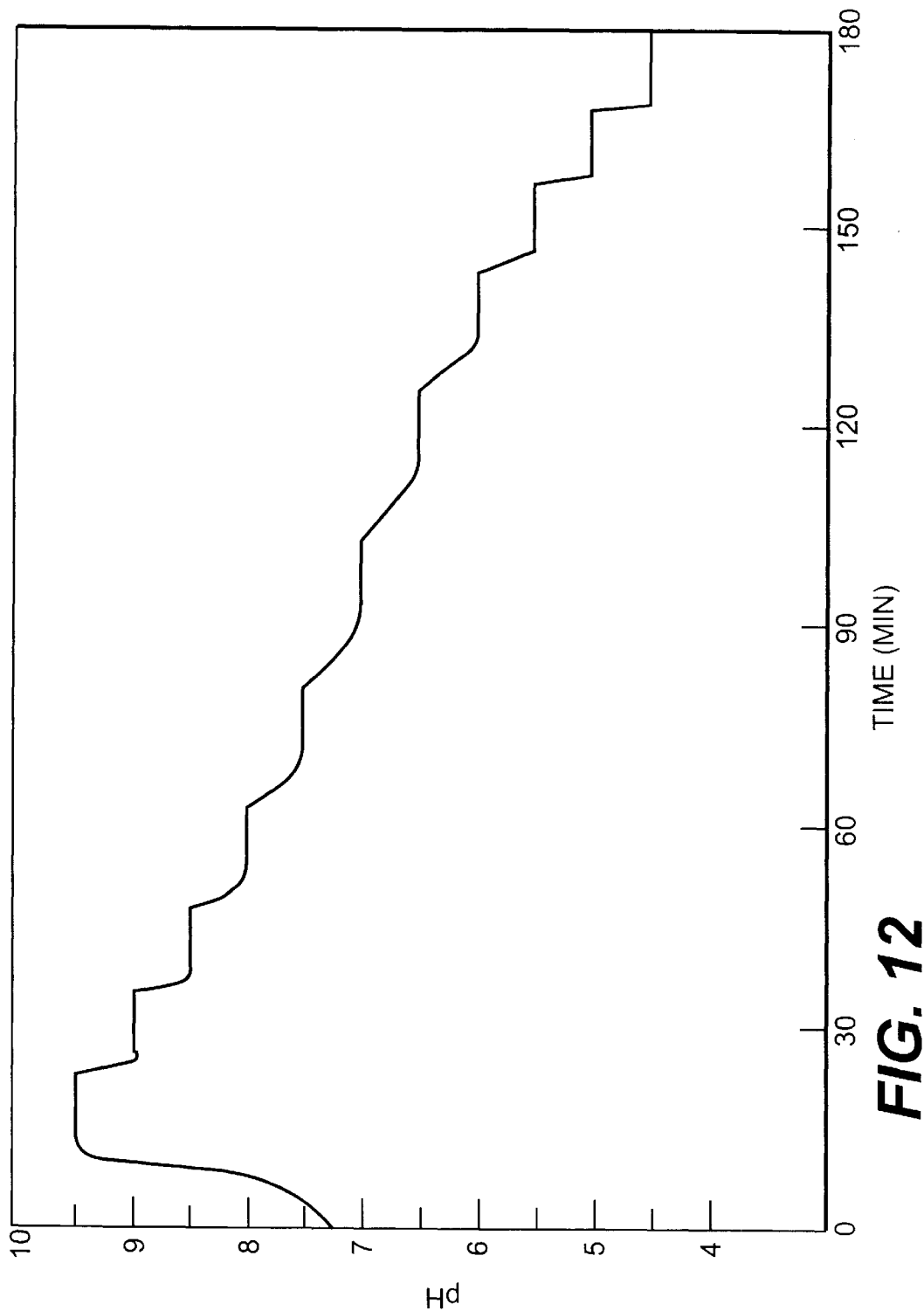

The staircase curve in FIG. 12 shows Regulation of the pH value in 8 ml of a 10 mmol phosphate buffer solution.

The pH value was dropped by 0.5 pH units in each case and then kept constant for 10 min. Regulation was accurate to 0.02 pH units. In the middle buffer range a drop in the control rate shows in the rounding of the pH steps.

Figure 13:
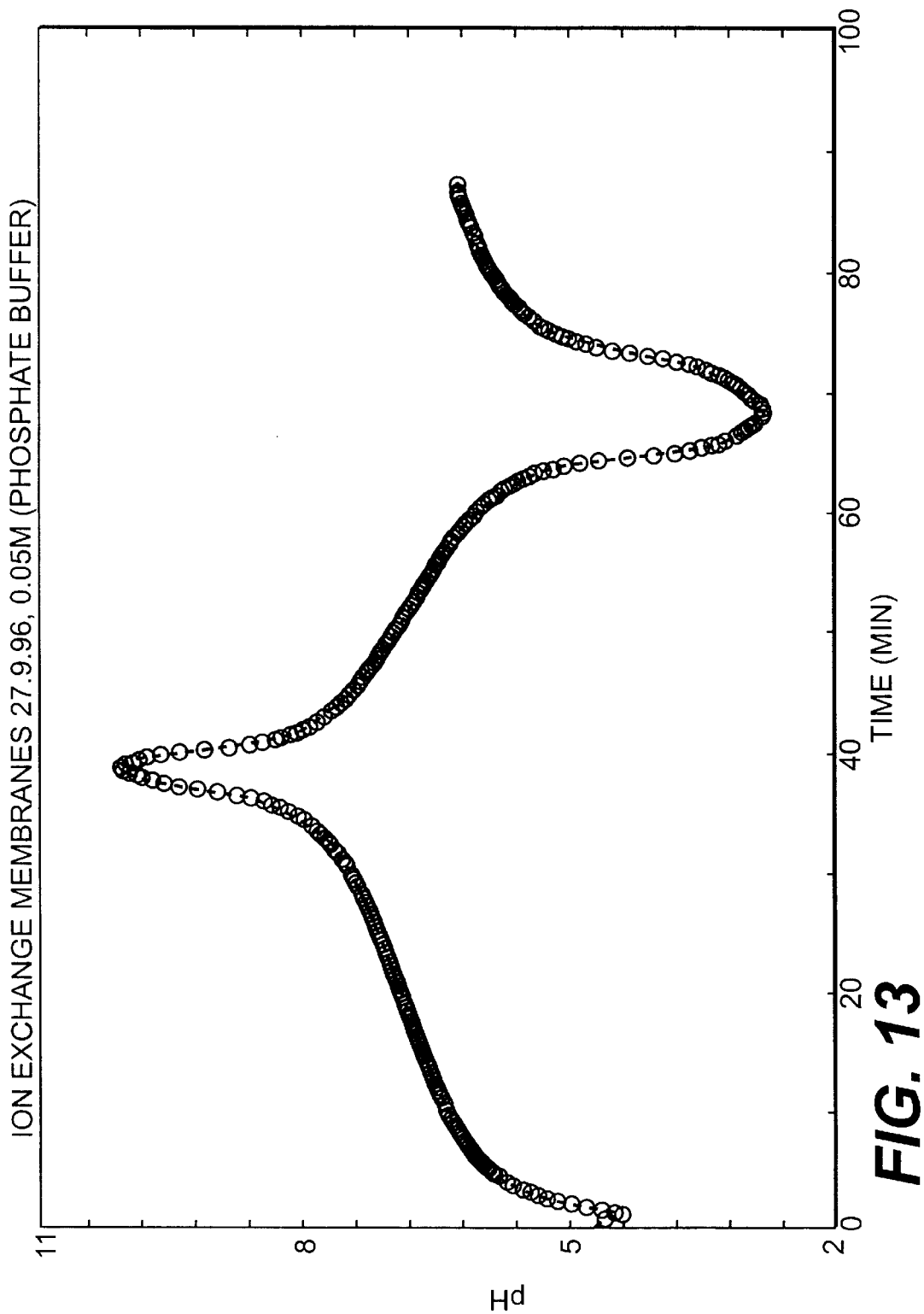

In heavily buffered solutions too, the pH time curve is equivalent to a conventional titration curve at constant current (FIG. 13). The current flow through individual chambers can be used in the same way if the rate of pH change is kept constant. In principle it is possible to deduce the quantity of anions and cations introduced from the current values. So the system is suitable, with known transport parameters, for simple, quantitative titration of solutions and solution components (e.g. also pH titration of enzyme solutions, biological or medical cell suspensions).

The system shown in FIG. 13 refers to a phosphate buffered (0.05 M), watery solution with volume of 80 ml. Unlike the pin filling used in FIG. 11, a cation exchanger membrane was used on the acid chamber and an anion exchanger membrane on the base chamber. The neutral phase operated with the acid chamber was slightly acidically buffered to lengthen the operating time, the other neutral phase being kept correspondingly basic. The ion exchanger membranes further shorten the adjustment times to a factor of approx. ½. If the relationships are to be made clearer (e.g. for quantitative detection of the titrated protons or hydroxyl ions), ion exchanger counter-membranes will be used on the first and second neutral phases.

Figure 14:
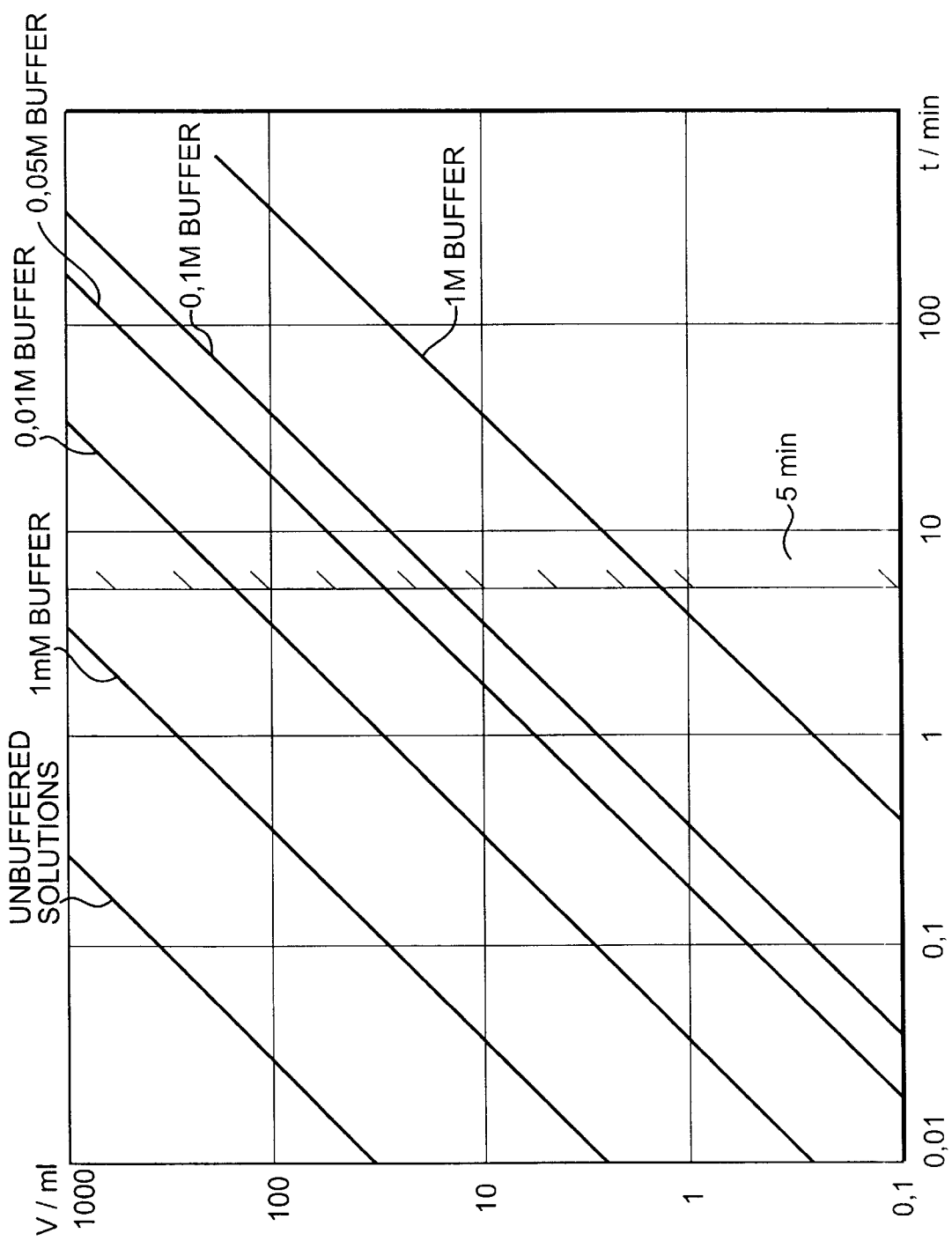
FIG. 14: characteristic adjustment times as function of adjustment volume and adjustment solution.

The conductivity of the solution can be altered in any way without influencing the control characteristics. The conditions (control current and buffer characteristics of the adjustment solution) determine the time for the ions (especially pH Regulation). This time is shown in FIG. 14 as a function of the considered volume for different buffer concentrations. This is based on a current of 250 mA through the chamber respectively used.

Preferred applications of the invention are:
1. pH value adjustment in conventional, randomly selected vessels (from beaker to $\mu l$ volume and less) for medical, chemical, pharmaceutical and technical purposes.
2. pH value Regulation by programs or in another specified way as an integral component of medical, chemical, biotechnical, pharmacological and technical apparatus.
3. pH value Regulation for medical, incorporal and excorporal purposes.
4. a pH stat.

We claim:

1. A device for amperometric adjustment of an ion concentration in an adjustment solution, comprising:
    at least three control electrodes wherein each control electrode is positioned within a chamber-shaped electrolyte region having a diffusion depressant means, said chamber-shaped electrolyte region can be filled with an electrolyte, and each said control electrode being separated from said adjustment solution by said diffusion depressant means so that no control electrode is positioned in said adjustment solution directly, whereby the electrolyte regions can all be brought into contact with the adjustment solution in such a way that, when current flows through the control electrodes, ions can be transported from the electrolytes through the diffusion depressant means into the adjustment solution or in the reverse direction, and
    means for supplying the electrolyte regions with control currents.

2. Device according to claim 1 characterized in that the device is designed for adjustment of the pH value and/or an ion concentration of the adjustment solution said ion concentration being different to the hydrogen ion concentration.

3. Device according to claim 1 in which three electrolyte regions are provided and comprise:
    a first regulator means (A) whose electrolyte acts as an anion donator or base regulator and whose electrode is a cathode,
    a second regulator means (B) whose electrolyte acts as a cation donator or acid regulator and whose electrode is an anode, and
    a first neutral phase (C) whose electrolyte acts either as a cation donator or an anion donator and whose electrode can be operated accordingly as an anode or cathode, or whose electrolyte exhibits such a high concentration that the H or OH ions transportable into the adjustment solution are negligible compared to the ion flow from the first and second regulator means.

4. Device according to claim 3 in which a fourth electrolyte region is provided that comprises a second neutral phase (D), whereby
    the first neutral phase (C) acts as a cation donator and whose electrode can be operated as an anode, and
    the second neutral phase (D) acts as an anion donator and whose electrode can be operated as a cathode, or the electrolyte of both neutral phases exhibits such a high concentration that the H or OH ions transportable into the adjustment solution are negligible compared to the ion flow from the first and second regulator means.

5. Device according to claim 1 in which holding means are provided for common holding at least two or all electrolyte regions.

6. Device according to claim 5 in which the electrolyte regions are arranged to be held next to one another.

7. Device according to claim 6 in which the electrolyte regions are arranged so that the diffusion depressant means are adjacent to one another.

8. Device according to claim 7 in which the adjacent diffusion depressant means are formed as a diffusion head that can be immersed at least partially in the adjustment solution or set down upon it.

9. Device according to claim 5 in which the common holded electrolyte regions are spaced for each other.

10. Device according to claim 5 in which the holding means are part of the inner wall of a vessel for receiving the adjustment solution.

11. Device according to claim 1 in which at least one stirrer means is provided for mixing the adjustment solution.

12. Device according to claim 1 in which at least one ion or pH sensor is provided that can be brought into contact with the adjustment solution at the same time as the electrolyte regions or separately from them.

13. Device according to claim 1 in which the diffusion depressant means comprise gels, ion exchangers, membranes, pores, diaphragms comprise at least one opening, with a size in the $\mu m$ range, or further chambers with a certain ion composition.

14. Device according to claim 1 in which at least one electrolyte region contains a diffusion depressing insert formed of gels, ion exchangers, membranes, pores, diaphragms, glass spheres, fibers or a firm electrolyte and separating the electrode from the diffusion depressant means.

15. Device according to claim 1 in which at least one electrolyte region has ventilation means for extracting gas from the electrolyte region.

16. Device according to claim 1 in which regeneration means are provided for partial mixing of the content of the electrolyte regions or for exchanging or renewing the particular electrolyte, whereby the regeneration means comprise at least one of the following means:

an overflow, a diaphragm, a current and flow limiting opening between the electrolyte regions, or a valve-type controllable means of transfer for active and dosed transfer of part of the content of one or all electrolyte regions.

17. Device according to claim 1 in which at least one electrolyte region has several electrodes that can be driven separately with different currents.

18. Device according to claim 1 in which the following are further provided:

at least one conductivity sensor that can be brought into contact with the adjustment solution and/or means for temperature detection and/or compensation.

19. Ion adjusting instrument that contains at least one device according to claim 1, whereby jointly held electrolyte regions form a compact construction as a pin, plate, sphere, cylinder, ellipse or other self-contained geometry, and that can be brought into at least partial contact with the adjustment solution and is preferably immersed in it.

20. Ion adjusting instrument according to claim 19 that further includes one or more of the following:

a control system for partial substitution or addition of one or more ion types using a further electrolyte region containing a solution of the ion type, a control system for recording titration curves and for correlation with chemical or biochemical reactions by detecting or stabilizing the solution composition of the electrolyte regions and detecting the control currents, a system in which, without an ion or pH sensor, an ion concentration or pH change is produced in a solution simply by setting the control currents, a device for acid and/or base titration.

21. Method for amperometric adjustment of an ion concentration of an adjustment solution comprising the steps:

filling of a system for amperometric adjustment of ion concentration with a variety of electrolytes that has at least three control electrodes wherein each control electrode is positioned within a chamber-shaped electrolyte region having a diffusion depressant means and which can be filled with an electrolyte, said control electrode being separated from said adjustment solution by said diffusion depressant means so that no control electrode is positioned directly in said adjustment solution, contacting of the diffusion depressant means of the electrolyte regions with the adjustment solution, driving of the electrolyte regions with control currents, whereby, when current flows through the control electrodes, ions are transported from the electrolytes through the diffusion depressant means into the adjustment solution or in reverse direction in such a way that the ion concentration of the adjustment solution changes.

22. A method according to claim 21, wherein the concentration of $H^+$ and/or the concentration of an ion other than $H^+$ is adjusted.

23. The method according to claim 21, wherein the $H^+$ ion concentration is adjusted.

24. The method of claim 21, wherein the concentration of an ion other than $H^+$ is adjusted.

25. A method according to claim 21, wherein the driving of said electrodes is controlled by an ion or pH sensor.

26. A method according to claim 25, wherein a change in concentration of $H^+$ ion, the concentration of a cation other than $H^+$ and/or the concentration of an anion in the electrolyte region is a parameter in the control process.

* * * * *